United States Patent
Reitmayr et al.

(10) Patent No.: US 9,576,183 B2
(45) Date of Patent: Feb. 21, 2017

(54) FAST INITIALIZATION FOR MONOCULAR VISUAL SLAM

(71) Applicant: QUALCOMM Incorporated, San Diego, CA (US)

(72) Inventors: Gerhard Reitmayr, Graz (AT); Alessandro Mulloni, Vienna (AT)

(73) Assignee: QUALCOMM Incorporated, San Diego, CA (US)

( * ) Notice: Subject to any disclaimer, the term of this patent is extended or adjusted under 35 U.S.C. 154(b) by 407 days.

(21) Appl. No.: 13/831,405

(22) Filed: Mar. 14, 2013

(65) Prior Publication Data

US 2014/0126769 A1  May 8, 2014

Related U.S. Application Data

(60) Provisional application No. 61/722,091, filed on Nov. 2, 2012.

(51) Int. Cl.
*G06K 9/00* (2006.01)
*G06T 7/00* (2006.01)

(52) U.S. Cl.
CPC ......... *G06K 9/00201* (2013.01); *G06T 7/0042* (2013.01); *G06T 2207/10016* (2013.01)

(58) Field of Classification Search
CPC ................................................ G06K 9/00201
See application file for complete search history.

(56) References Cited

U.S. PATENT DOCUMENTS

| 5,889,505 A | 3/1999 | Toyama et al. |
| 6,288,704 B1 | 9/2001 | Flack et al. |
| 8,274,406 B2 | 9/2012 | Karlsson et al. |
| 8,532,367 B2 * | 9/2013 | Kaganovich .......... G06T 7/0071 345/169 |
| 2008/0310757 A1 * | 12/2008 | Wolberg et al. .............. 382/285 |
| 2010/0208057 A1 | 8/2010 | Meier et al. |
| 2011/0043639 A1 | 2/2011 | Yokohata |
| 2011/0164832 A1 * | 7/2011 | Yoon et al. ................... 382/294 |
| 2012/0134538 A1 | 5/2012 | Kimura |
| 2012/0147152 A1 * | 6/2012 | Vogiatis ................ G06T 7/0065 348/50 |

(Continued)

FOREIGN PATENT DOCUMENTS

| TW | 200508977 | 3/2005 |
| TW | 201214266 A | 4/2012 |

OTHER PUBLICATIONS

Gruber et al (NPL: "Optimization of Target Objects for Natural Feature Tracking", 2010, International Conference on Pattern Recognition, pp. 4.).*

(Continued)

*Primary Examiner* — Oneal R Mistry
(74) *Attorney, Agent, or Firm* — Silicon Valley Patent Group LLP

(57) ABSTRACT

Apparatuses and methods for fast visual simultaneous localization and mapping are described. In one embodiment, a three-dimensional (3D) target is initialized immediately from a first reference image and prior to processing a subsequent image. In one embodiment, one or more subsequent reference images are processed, and the 3D target is tracked in six degrees of freedom. In one embodiment, the 3D target is refined based on the processed the one or more subsequent images.

36 Claims, 7 Drawing Sheets

(56) References Cited

U.S. PATENT DOCUMENTS

| | | |
|---|---|---|
| 2012/0194517 A1* | 8/2012 | Izadi et al. .................... 345/420 |
| 2012/0223956 A1 | 9/2012 | Saito et al. |
| 2013/0009950 A1* | 1/2013 | Ben-David et al. .......... 345/419 |
| 2013/0222369 A1* | 8/2013 | Huston et al. ................ 345/419 |
| 2014/0003705 A1* | 1/2014 | Taguchi ............... G06T 7/0032 382/154 |
| 2014/0037136 A1* | 2/2014 | Ramalingam ......... G06T 7/0042 382/103 |

OTHER PUBLICATIONS

Taiwan Search Report—TW102139873—TIPO—Sep. 23, 2014.

Civera J., et al., "Inverse Depth Parametrization for Monocular SLAM," IEEE Transactions on Robotics, Oct. 2008, vol. 24, No. 5, pp. 932-945, XP011332780, ISSN: 1552-3098, DOI:10.1109/TRO.2008.2003276.

International Search Report and Written Opinion—PCT/US2013/065654—ISA/EPO—Jan. 16, 2014.

Beder, et al., "Determining an initial image pair for fixing the scale of a 3D reconstruction from an image sequence," DAGM 2006, LNCS 4174, pp. 657-666.

Gan, et al., "Vision-Based Augmented Reality Visual Guidance with Keyframes," CGI 2006, LNCS 4035, pp. 692-701.

Klein G., et al., "Parallel Tracking and Mapping for Small AR Workspaces," 6th IEEE and ACM International Symposium on Mixed and Augmented Reality, 2007. ISMAR 2007. pp. 225-234.

Klein G., et al., "Parallel Tracking and Mapping on a Camera Phone", Mixed and Augmented Reality 2009, ISMAR 2009, 8th IEEE International Symposium on IEEE, Piscataway, NJ, USA, Oct. 19, 2009 (Oct. 19, 2009), pp. 83-86.

Anonymous: "Levenberg-Marquardt Algorithm", Wikipedia, the free encyclopedia, Dec. 28, 2012 (Dec. 28, 2012), pp. 1-6, XP055253356, Retrieved from the Internet: https://en.wikipedia.org/w/index.php?title=Levenberg%E2%80%93Marquardt_algorithm&oldid=515002053 [retrieved on Feb. 26, 2016].

* cited by examiner

FAST INITIALIZATION FOR MONOCULAR VISUAL SLAM

CROSS-REFERENCE TO RELATED APPLICATIONS

This application claims the benefit of and priority to U.S. Provisional Application No. 61/722,091, filed Nov. 2, 2012, which is hereby incorporated by reference in its entirety.

FIELD

The subject matter disclosed herein relates generally to visual simultaneous localization and mapping.

BACKGROUND

Simultaneous localization and mapping (SLAM) is used in augmented reality systems and robot navigation to build a target from an environment or scene. Visual SLAM (VSLAM) uses camera or visual sensor data or images as input to build a target or model of the environment. When VSLAM used in conjunction with an Augmented Reality (AR) system, virtual objects can be inserted into a user's view of the real world and displayed on a device (e.g., a mobile device, cell phone or similar).

One common pre-requisite for VSLAM to track or determine camera position and orientation (pose) is to use a known reference. For example, a known or previously acquired reference can be a 3-Dimensional (3D) model of the environment or artificial marker inserted into the real world. Traditional VSLAM may also require the first reference image to be a precise frontal view of a planar surface in the environment before initialization and tracking. Otherwise, without a known reference or precisely captured initial image, objects can appear at the wrong location or mapping of the environment may fail altogether.

A tracking system utilizing VSLAM with a single camera may also rely upon initializing a 3D target from two separate reference images captured by the single camera. Creating a 3D target using traditional techniques based on the two reference images is only possible if the camera motion between the two reference images is appropriate, and also maintains enough overlap between the scenes in both images. Reference images may be determined as appropriate when there is sufficient minimum translation between two specifically defined reference images.

Traditional VSLAM implementations may also rely on direct user input to select the two reference images or to provide an additional visual target in order to record 6 Degrees of Freedom (6 DoF) camera motion before a 3D target can be initialized. For example, some tracking methods require the user to perform a specific unintuitive motion sequence without visual feedback so that 3D reconstruction methods can be used to find a real plane in the environment and initialize the 3D target from this plane.

As a result of the above limitations of traditional VSLAM methods, the current augmented reality user's experience can often be frustrating and feel unnatural. Moreover, most users are unlikely to know or understand the camera motions necessary for traditional VSLAM initialization. Typical users are also frequently confused as to why they should have to perform the specific motions before an augmented reality system can display tracking updates for a scene.

Accordingly, improved VSLAM initialization and tracking are desirable.

SUMMARY

Embodiments disclosed herein may relate to a method for visual simultaneous localization and mapping. The method includes initializing a three-dimensional target from a first reference image and prior to processing a subsequent image. The method further includes processing one or more the subsequent images, tracking the 3D target in 6 DoF, and refining the 3D target based on the processing of the one or more subsequent images.

Embodiments disclosed herein may also relate to a computer readable non-transitory storage medium with instructions to perform visual simultaneous localization and mapping. The medium includes instructions for initializing a three-dimensional target from a first reference image and prior to processing a subsequent image. The medium further includes instructions for processing one or more the subsequent images, tracking the 3D target in 6 DoF, and refining the 3D target based on processing of the one or more subsequent images.

Embodiments disclosed herein may also relate to an apparatus that includes means for initializing a three-dimensional target from a first reference image and prior to processing a subsequent image. The apparatus further includes instructions for processing one or more the subsequent images, tracking the 3D target in 6 DoF, and refining the 3D target based on processing of the one or more subsequent images.

Embodiments disclosed herein may further relate to a data processing system including a processor and a storage device configurable to store instructions to perform visual simultaneous localization and mapping. The instructions cause the processor to initialize a three-dimensional target from a first reference image and prior to processing one or more subsequent images. The instructions further cause the processor to process the subsequent image, track the 3D target in 6 DoF, and refine the 3D target based on processing of the one or more subsequent images.

Other features and advantages will be apparent from the accompanying drawings and from the detailed description.

DETAILED DESCRIPTION

The word "exemplary" or "example" is used herein to mean "serving as an example, instance, or illustration." Any aspect or embodiment described herein as "exemplary" or as an "example" is not necessarily to be construed as preferred or advantageous over other aspects or embodiments.

Figure 1:
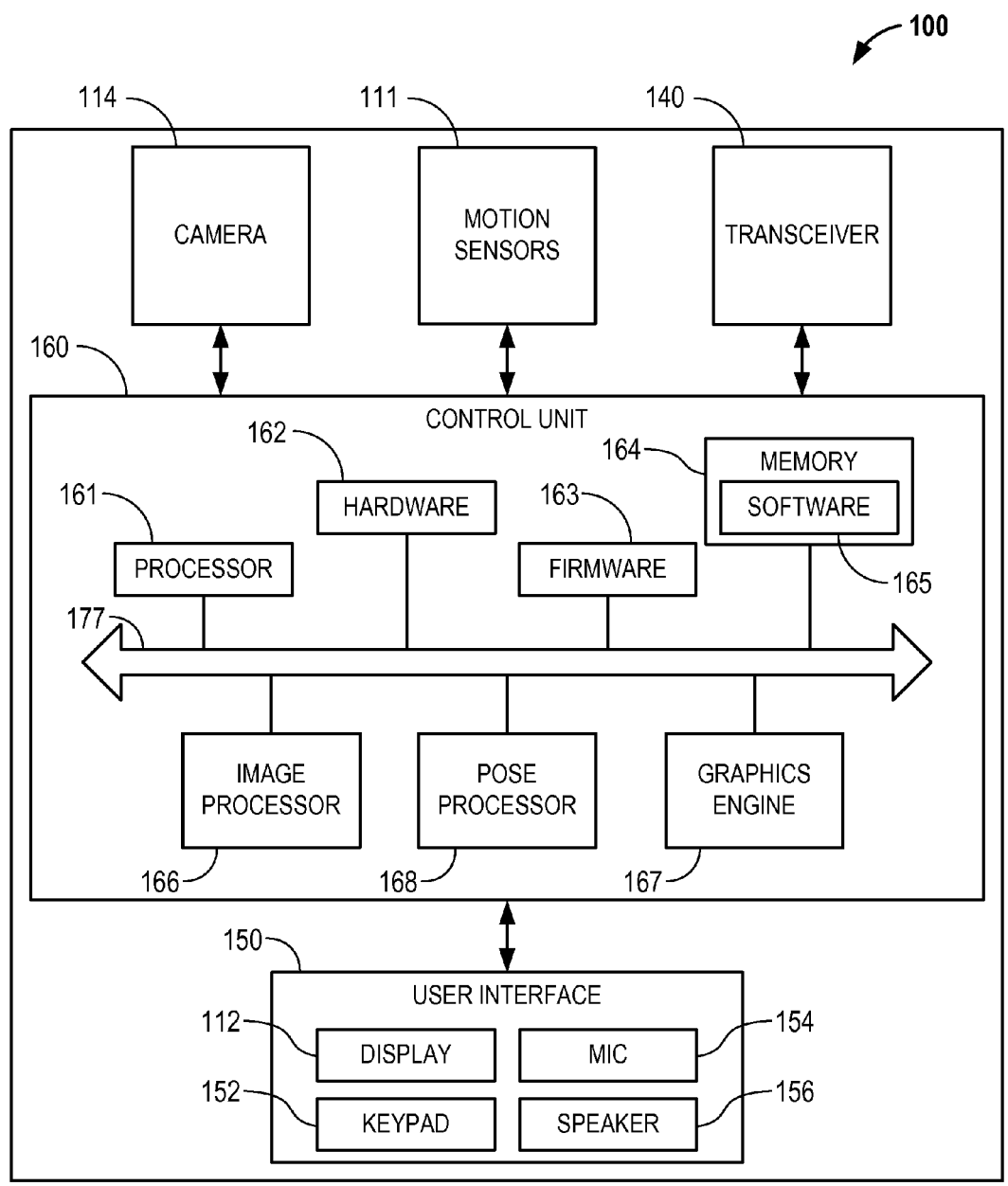
FIG. 1 is a block diagram of one embodiment of a system capable of performing disclosed methods.

FIG. 1 is a block diagram illustrating a system capable of performing disclosed methods. The system may comprise device 100, which may include a general purpose processor 161, image processor 166, pose processor 168, graphics engine 167, and a memory 164. The device 100 may also include a number of device sensors coupled to one or more buses 177 or signal lines further coupled to at least one of the processors 161, 166, and 168. The device 100 may be a: mobile device, wireless device, cell phone, personal digital assistant, wearable device (e.g., eyeglasses, watch, head wear, or similar bodily attached device), mobile computer, tablet, personal computer, laptop computer, or any type of device that has processing capabilities.

In one embodiment, device 100 may be a mobile/portable platform. Device 100 can include a means for capturing an image, such as camera 114 and/or CMOS/visual sensors (not shown) and may optionally include motion sensors 111, such as accelerometers, gyroscopes, electronic compass, or other similar motion sensing elements. The device 100 may also capture images on a front and/or rear-facing camera (e.g., cameras 114). The device 100 may further include a user interface 150 that includes a means for displaying an augmented reality image, such as the display 112. The user interface 150 may also include a keyboard, keypad 152, or other input device through which the user can input information into the device 100. If desired, integrating a virtual keypad into the display 112 with a touch screen/sensor may obviate the keyboard or keypad 152. The user interface 150 may also include a microphone 154 and speaker 156, e.g., if the device 100 is a mobile platform such as a cellular telephone. Device 100 may include various other elements, such as a satellite position system receiver, power device (e.g., a battery), as well as other components typically associated with portable and non-portable electronic devices.

Device 100 may function as a mobile or wireless device and may communicate via one or more wireless communication links through a wireless network that are based on or otherwise support any suitable wireless communication technology. For example, in some aspects, the device 100 may be a client or server, and may associate with a wireless network. In some aspects the network may comprise a body area network or a personal area network (e.g., an ultra-wideband network). In some aspects the network may comprise a local area network or a wide area network. A wireless device may support or otherwise use one or more of a variety of wireless communication technologies, protocols, or standards such as, for example, CDMA, TDMA, OFDM, OFDMA, WiMAX, and Wi-Fi. Similarly, a wireless device may support or otherwise use one or more of a variety of corresponding modulation or multiplexing schemes. A mobile wireless device may wirelessly communicate with other mobile devices, cell phones, other wired and wireless computers, Internet web-sites, etc.

As described above, device 100 can be a portable electronic device (e.g., smart phone, dedicated augmented reality (AR) device, game device, or other device with AR processing and display capabilities). Device 100, which may implement the AR system described herein, may be used in a variety of environments (e.g., shopping malls, streets, offices, homes or anywhere a user may use their device). Users may be able to interface with multiple features of device 100 in a wide variety of situations. In an AR context, a user may use device 100 to view a representation of the real world through display 112. A user may interact with AR capable device 100 by using camera 114 to receive real world images/video. Device 100 may then process the images in a way that superimposes additional or alternate information onto the displayed real world images/video. In some embodiments, in an AR implementation on device 100, real world objects or scenes may be replaced or altered in real-time, or near real-time, or within a short time window of image capture, and displayed to the user on display 112. Virtual objects (e.g., text, images, video) may be inserted into the representation of a scene depicted on a device display.

In one embodiment, a Fast VSLAM Initialization module (FVI) as described herein may extract or detect one or more interest points (e.g., 3D interest points associated with a target object or group of objects/scene) and can estimate a 6 DoF camera position and orientation (pose) from a set of point correspondences. The term module is used to refer to hardware, firmware, software, or some combination thereof that is capable of performing recited functions. In some embodiments, FVI may operate in real-time, near real time, or within a short time window of image capture. For example, in one embodiment, FVI may display an augmented representation of the input images so that the augmentations appear contemporaneously with images captured by camera 114 and with minimal user noticeable delay or time lag.

The FVI may output (e.g., display) an augmented representation of the input images or video (AR) after receiving the images or video input. As used herein, the detection of interest points and estimating the 6 DoF camera pose is referred to as "tracking" the target. The FVI may initialize without prior knowledge of the user's environment (e.g., without a prepopulated map, CAD model, markers in the scene or similar predefined target descriptor) and without the use of two different precise reference images before providing visual (e.g., displayed target adjustment) feedback.

The FVI may receive images or video from a single camera 114 or monocular visual input and provide tracking and camera pose determination. In one embodiment, the FVI may display augmentation of a scene (e.g., a modification or addition of a virtual object into a real world scene) in real-time, near real-time, within a short time window, or instantaneously upon receipt of a single reference image. In one embodiment, the FVI may provide accurate and real-time, near real-time, or instant tracking using a single reference image (e.g., an image frame captured from camera 114) and without additional sensor input from an accelerometer, laser rangefinder, gyroscope, GPS, or other sensors used for determining position. Expensive and complex multiple camera array systems may thus be avoided and the FVI may be coupled to commonly available camera sensors. For example, the camera may be coupled to a mobile device such as a smartphone or wearable device such as AR eyeglasses, and the AR capability may be implemented as a software application or program executed by the processor of the mobile device or by a processor in the AR eyeglasses.

Figure 2:
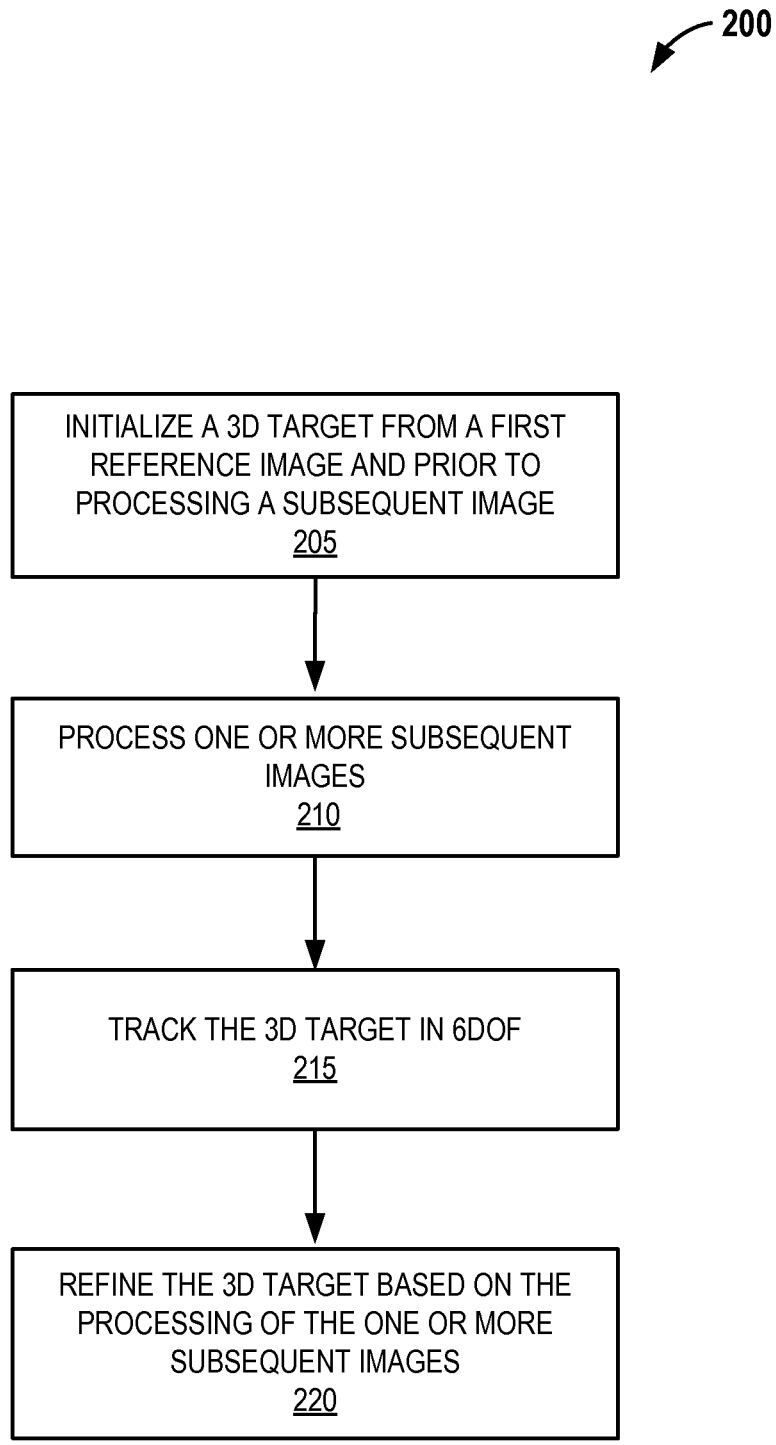
FIG. 2 illustrates a flow diagram of one embodiment of Fast VSLAM Initialization.

FIG. 2 illustrates a flow diagram of one embodiment of VSLAM Initialization. At block 205, the FVI may initialize a 3D target from a first reference image (e.g., a single reference image) and prior to processing a subsequent image. For example, initializing a first image (e.g., a single reference image captured from camera 114) may include determining a set of interest points in three-dimensional space with an initial estimated depth as described in further detail below. In some embodiments, the initialization may occur immediately, in real-time, near real-time, or within a short time window of the reference image capture.

In one embodiment, the FVI may create a target from an initial captured reference image. The target as used herein may also be understood to be a model, or map of a 3D object or scene. The FVI may create a target from a single image from a single camera sensor or monocular source. The target may be stored in memory (e.g., in memory 164 of device 100) and represented by or associated with one or more 3D interest points extracted or calculated from an image. In some embodiments, the 3D target may be initialized without any user input when selecting an initial reference image or a second reference image.

At block 210, the FVI may process one or more subsequent images. Processing may include determining a set of interest points within each of the subsequent images. In some embodiments, the set of interest points may be the same interest points determined after processing the reference image, however the location and depth values may be different than the reference image.

At block 215, the FVI may track the 3D target in six degrees of freedom. The FVI may begin tracking a target (e.g., scene, object, or map) based on the first image frame received. In some embodiments, tracking may occur immediately, instantaneously, in real-time, near real time, or within a short time period following the receipt by the FVI of the first single reference image. In some embodiments, VSLAM initialization may be readily apparent to an augmented reality user because a 3D target may be initialized instantly, in real-time, near real time, or within a short time period of frame capture. In some embodiments, the 3D target may be further refined when the user moves the camera 114 in any direction and additional images are received and processed. The FVI may display a representation of the target while tracking, as described in greater detail below.

At block 220, the FVI may refine the 3D target based on the processing of the one or more subsequent images. The FVI may determine whether the interest points may be estimated and incrementally refine the target over small movements. In one embodiment, the FVI may provide a camera motion estimate for initial small motions by approximating the target to a plane having assumed depth values. Also, in embodiments where the target is approximated with a plane, the step of explicitly solving for epipolar geometry (which may be dependent on having enough translation) can be omitted. Thus, in some embodiments, the FVI may initialize automatically and also provides continuous camera 114 tracking from the first reference image onwards. The FVI may also automatically select a second reference image from additional images recorded by camera 114 (e.g., subsequent image captures after the first initial referent image). The method of selecting the second reference image is described in further detail below. After a second reference image is selected tracking and camera 114 pose determination may continue based on the tracking and camera pose determination from the first and second reference image.

In one embodiment, upon discovery of an image with sufficient translation (e.g., larger movement) from an initial reference image, the discovered image may automatically be assigned as a second reference image. The interest points from the second reference image may be used to triangulate the target resulting in a further increase in tracking accuracy.

In some embodiments, a device 100 may be able to automatically start, execute, or run (e.g., by using processor 161) the FVI (e.g., as an FVI engine, software process or other implementation) without any direct or manual user interaction or trigger. Alternatively, in other embodiments, the FVI may cause device 100 to prompt a user to start initialization and tracking of a target by touching a touch screen, pressing a button, or similar input. In yet other implementations, the FVI may be integrated into an application or program and the application or program prompts the user or automatically captures an initial reference image and begins tracking.

The first image may be an initial or first reference image. The device 100 may capture an initial image with camera 114 and send the image to the FVI for augmented reality processing. In one embodiment, the initial image frame may be captured automatically by camera 114 when camera movement or motion is detected. It should be understood that as used herein, a captured image may be a still/photographic image frame or a video frame. For example, camera 114 may have video as well as still photo image capture capabilities.

In one embodiment, fast camera tracking starting from a first reference image (e.g., the first image captured by camera 114) is possible, at least in part, by processing a single first image (e.g., an initialization image captured from camera 114) and calculating a set of extracted interest points using an initial estimated depth. In one embodiment, an augmented reality program or application may display registered content (graphics) in a scene (e.g., on a display for a mobile device or computer) from initialization onwards, before any camera 114 motion is received (e.g., camera translation). The FVI may also display registered content in a scene when only rotational motion is received.

In one embodiment, the FVI may create an accurate dataset for target tracking without requiring specific motions from the user to initialize tracking. In one embodiment, the FVI may track a scene or object immediately and provide AR updates to the display (e.g., an augmentation of the target) in real-time, near real-time, instantaneously, or within a short time window. By enabling target tracking from initialization of a single initial reference image, users are encouraged to continue to move/reposition the camera and explore a target or scene with the device camera 114. Greater exploration of a scene at different angles and viewpoints may uncover more information about the target. The FVI may use the additional information learned while the user moves the camera to refine the target. In some embodiments, the FVI may provide real time display feedback using the refined target as a user moves the camera. In some embodiments, a second reference image that may be used to further refine the FVI's collected information about a target and camera pose may be discovered and selected while providing real time display feedback.

In augmented reality (AR) implementations, the FVI may optionally prompt the user for additional information to augment the target. For example, the user may be able to add user created or selected content to the representation on the device 100 display. User content may be an image, 3D object, video, text, or other content type that may be integrated with, or overlaid with, or replacing a representation of the target.

In one embodiment, fast target tracking from a first reference image (e.g., the first image captured by camera 114) may be facilitated, at least in part, by processing a first image (e.g., an initialization image captured from camera 114) as an 3D target (e.g., as a planar or other geometric shaped 3D target). In one embodiment, an FVI automatically selects the parts (e.g., interest points) of a scene (e.g., 3D map) that may be updated given the observed camera 114 motion. Thus, in some embodiments, the FVI may initialize automatically and provide continuous camera 114 tracking from the first reference image onwards to subsequently captured images. The FVI may also automatically select a second reference image from additional images recorded by camera 114 (e.g., subsequent image captures after the first initial referent image). After a second reference image is selected tracking and camera 114 pose determination may be further/fully refined based on the tracking and camera pose determination from the first and second reference image.

In one embodiment, the FVI may create an accurate dataset for 3D target tracking without a receiving any predetermined or pre-initialization input relating to a specific target shape, marker (real world or virtual) or tag. In some embodiments, the FVI may initialize 3D targets without prior knowledge of the shape of the 3D target and without knowledge of the existence of specific features within the 3D target. For example, in one embodiment, instead of receiving a predefined target object or target with known coordinates, the FVI may initialize the 3D target and may set an equal depth to every discovered feature. Therefore, in one embodiments, the dataset for the 3D target may be fully populated with depth and location for all interest points from the first single reference image. Any errors in depth may be corrected as the camera pose changes with respect to the 3D target.

In one embodiment, an AR program or application may display registered content (graphics) in a scene (e.g., on a display for a mobile device or computer) from initialization onwards, before any camera 114 or rotational motion is received. For example, the AR program may provide an AR representation of the target on the display of a mobile phone or handheld device.

An interest point as used herein may be defined as an interesting or notable part of an image. Interest point detection may be a low-level image processing operation to examine every pixel to determine whether an interest point exists at a particular pixel. Alternatively, a high-level algorithm may also be used for interest point detection. Interest point detection may process an entire image frame or, alternatively subsections of the image.

The interest points extracted from the image may represent distinct points along three-dimensional space (e.g., coordinates of axes X, Y, and Z). A target, as used herein, may include interest points extracted from or associated with a single isolated object within an image, or multiple objects. For example, an entire scene captured in an image may include multiple objects and each object may have one or more extracted interest points. A group of objects within an image or scene may also have a collective combined interest point set associated with the entire group.

In one embodiment, the FVI's extraction of interest points with an initial estimated depth allows for tracking and camera pose determination for non-planar scenes (e.g., scenes that are not a single plane parallel to the initial reference image or image, but may be in a plane that is in an arbitrary position, or a different 3D surface, or scenes that have no dominant planar structure at all).

For each captured image or video frame, once interest points have been detected, a local image patch around the interest point may be extracted. Interest points may be extracted using a well-known technique, such as Scale Invariant Feature Transform (SIFT), which localizes interest points and generates their descriptions. If desired, other techniques, such as Speed Up Robust Features (SURF), Gradient Location-Orientation histogram (GLOH), or other comparable techniques may be used. In some embodiments, when the number of extracted interest points for an image is determined to exceed a threshold (e.g., 100 interest points or other number of points) the image may be saved as a first reference image and the extracted interest points may be defined as reference points.

In some embodiments, the FVI may track a target without the use of any accelerometer data (e.g., the target may be in any orientation relative to gravity, and horizontal or vertically aligned objects are equally viable for FVI tracking). Furthermore, the FVI may track a target of any shape (e.g., the FVI does not rely upon a rectangular or another defined geometric structure in order to identify and track the target). In some embodiments, because the FVI does not require or assume a complete target shape/structure in order to track a target, the FVI may track a target even when the target is partially occluded. For example, the FVI may track a target that even when one or more portions of the target are missing or obscured from the initial reference frame. The FVI may update the target with additional discovered interest points as the camera is moved in 6 DoF.

In some embodiments, the FVI may not require user input, nor rely on other tracking initialization methods to begin tracking a target. For example, FVI tracking does not rely on the user to move the camera in particular motions, stand in a particular location, hold the camera horizontally, or perform other forms of tracking initialization methods before tracking the target.

As described above, device 100 may be a portable electronic device (e.g., smart phone, dedicated augmented reality (AR) device, game device, wearable device such as eyeglasses, or other device with AR processing and display capabilities). The device implementing the AR system described herein may be used in a variety of environments, such as shopping malls, streets, rooms, or anywhere a user may take a portable device. In an AR context, a user may use the device 100 to view a representation of the target and real world through the display of their device.

A user may interact with an AR capable device by using the device's camera to receive real world images/video and superimpose or overlay additional or alternate information onto the displayed real world images/video on the device. As a user views an AR implementation on their device, real world objects or scenes may be replaced or altered in real time on the device display. Virtual objects (e.g., text, images, video) may be inserted into the representation of a scene depicted on a device display. For example, a customized virtual photo may be inserted on top of a real world sign, poster or picture frame. Another example placing a 3D virtual character (e.g., a video game character) into a real world scene, such as within an office or home environment viewed with the camera and AR device.

In one embodiment, a user's experience of an AR device may be greatly enhanced by automatically updating the AR displayed on the device as the user moves the device and without prior knowledge of the user's environment. For example, in some embodiments, FVI may operate without a map, CAD model, markers in the scene or similar. The FVI may also enhance a user's experience by providing visual feedback (e.g., AR updates to the target represented on the display 112) without multiple different and precise image captures. In some embodiments, visual updates to the AR system may be provided to the display and user in real-time, near real-time, almost instantaneously, or within a short time window of capturing the first reference image.

In one embodiment, by using anywhere augmentation, the FVI may provide interactive feedback to the user of how augmentations will be anchored to a selected point in the environment, as soon as the user points the camera at the point. For example, upon initialization on a device, the FVI may allow a user to automatically select a target merely by pointing the camera at the target.

Movement of the device 100 and camera 114 may cause the display to update, in real-time, an augmentation of the target (e.g., one or more objects or scenes) being tracked. With movement of the device away from an initial reference image position, the device may capture additional images from alternate views. As the alternate views are displayed, scene augmentation may become more accurate while the FVI processes the additional images. The FVI may estimate 3D position of extracted interest points associated with the target to obtain 3D knowledge of the environment the camera is looking at. Using a vision-based solution for tracking interest points, local normal vectors and relative distances between points may be inferred.

In one embodiment, an object or graphic may be inserted or integrated into a video stream (or image) captured by the camera 114 and displayed on display 112. The display may, in some embodiments, update in real-time with seamless tracking from the original scene. For example, text on a sign may be replaced with alternate text, or a 3D object may be strategically placed in the scene and displayed on device 100. When the user changes the position and orientation of the camera 114, the graphic or object may be adjusted or augmented to match the relative movement of the camera 114.

In one embodiment, the FVI may cast a ray from the camera in the camera view direction into an estimated dominant plane (e.g., the plane initialized at the initial depth described above). The FVI may estimate the direction of gravity using the accelerometer, and wherever the camera is pointed, use the direction of gravity in addition to the ray cast from the camera, to correctly align, position, and distance a 3D augmentation of the target for display. For example, if a virtual object is inserted into an augmented reality display, camera movement away from the virtual object may reduce the size of the virtual object relative to the distance traveled by the camera 114. For example, taking four steps back from a virtual object should cause a greater reduction in size of the virtual object compared to taking a half step back from the virtual object, all other variables being equal. Motion graphics or animation may be animated within the scene represented by the FVI. For example, an animated object may "move" within a scene depicted in the augmented reality display.

In one embodiment, while camera 114 moves and camera pose changes (e.g., by user or robot initiated movement) the FVI may select an appropriate image to be used as a second reference image. The second reference image may be selected from an image feed or stream. After extracting interest points and triangulating from the second reference image, increased accuracy of the augmentation may be achieved (e.g., borders around an object may fit more precisely, the representation of the object in the scene will appear more realistic, and target placement may be more accurate relative to the camera 114 pose).

A person of skill in the art will recognize that embodiments described herein may be implemented in ways other than AR (e.g., robot positioning or other implementation to utilize FVI).

In one embodiment, the FVI may be implemented as an engine or module executed by a processor to receive images or video as input. The FVI may begin with receiving a single image $I_0$. The camera pose associated with the initial image $I_0$ is $C_0 = I^{4 \times 4}$, the identity. 2D interest points $p_i = (u_i, v_i)$ may be extracted from the single image. Each interest point may be associated with an initial depth $z_i = 1$. The depth may be stored as inverse depth $w_i = 1/z_i$. The 3D location of the point $X_i$ corresponding to the interest point $p_i$ is then $X_i = (u_i, v_i, 1, w_i)^T$ represented in homogeneous coordinates.

For any subsequent camera image $I_t$ captured at time t, the camera position $C_t$ is estimated from measurements of the 2D locations of the 3D points $X_i$. The points $X_i$ are reprojected into the current image $I_t$ using the last known camera pose $C_{t-1}$ and new measurements of the 2D location in image $I_t$ may be made. In one embodiment, the new measurements of the 2D location in image $I_t$ may be obtained using normalized cross correlation between image patches taken from image $I_0$, or another method of obtaining image correspondences. Using such a method, a 2D location $m_i$ can be observed for each point $X_i$. Then, both the camera location $C_t$ as well as the inverse depth $w_i$ of each point can be optimized using a Gauss-Newton non-linear refinement scheme.

The projection function is:

$$p = proj\left( \begin{pmatrix} R & T \\ 0 & 1 \end{pmatrix}_t \begin{pmatrix} u \\ v \\ 1 \\ w \end{pmatrix} \right) = proj\left( R \begin{pmatrix} u \\ v \\ 1 \end{pmatrix} + Tw \right)$$

The Jacobians with respect to R, T and w are:

$$J_{R,T} = \frac{\partial proj(X)}{\partial X} \partial(R, T) \begin{pmatrix} u \\ v \\ 1 \\ w \end{pmatrix}$$

and $$J_w = \frac{\partial proj(X)}{\partial X} T.$$

When the camera translation T of $C_{t-1}$ is too small, the Jacobian $J_w$ of the observation $m_i$ with respect to the inverse depth $w_i$ of the 3D point vanishes (becomes small and almost zero) which can preclude an accurate estimation of the inverse depth. Therefore, during the Gauss-Newton iteration, for each point the information matrix $J_w^T J_w$ of the inverse depth parameter is tested. The information matrix is in this case only a non-negative scalar value; if it is below a threshold, such as $10^{-3}$, its inverse is set to 0. Setting the inverse to 0 avoids updating the depth coordinate, because this cannot be done reliably in this case.

In one embodiment, the FVI can always estimate the camera pose, because the points $X_i$ have known depth coordinates. Therefore, in one embodiment, the camera parameter part of the optimization is always well constrained.

Optimizing and updating both camera pose parameters and the inverse depth coordinates $w_i$ of all points can result in a new camera pose $C_t$ and new depth estimates for all points for which the Jacobians did not vanish.

Figure 3:
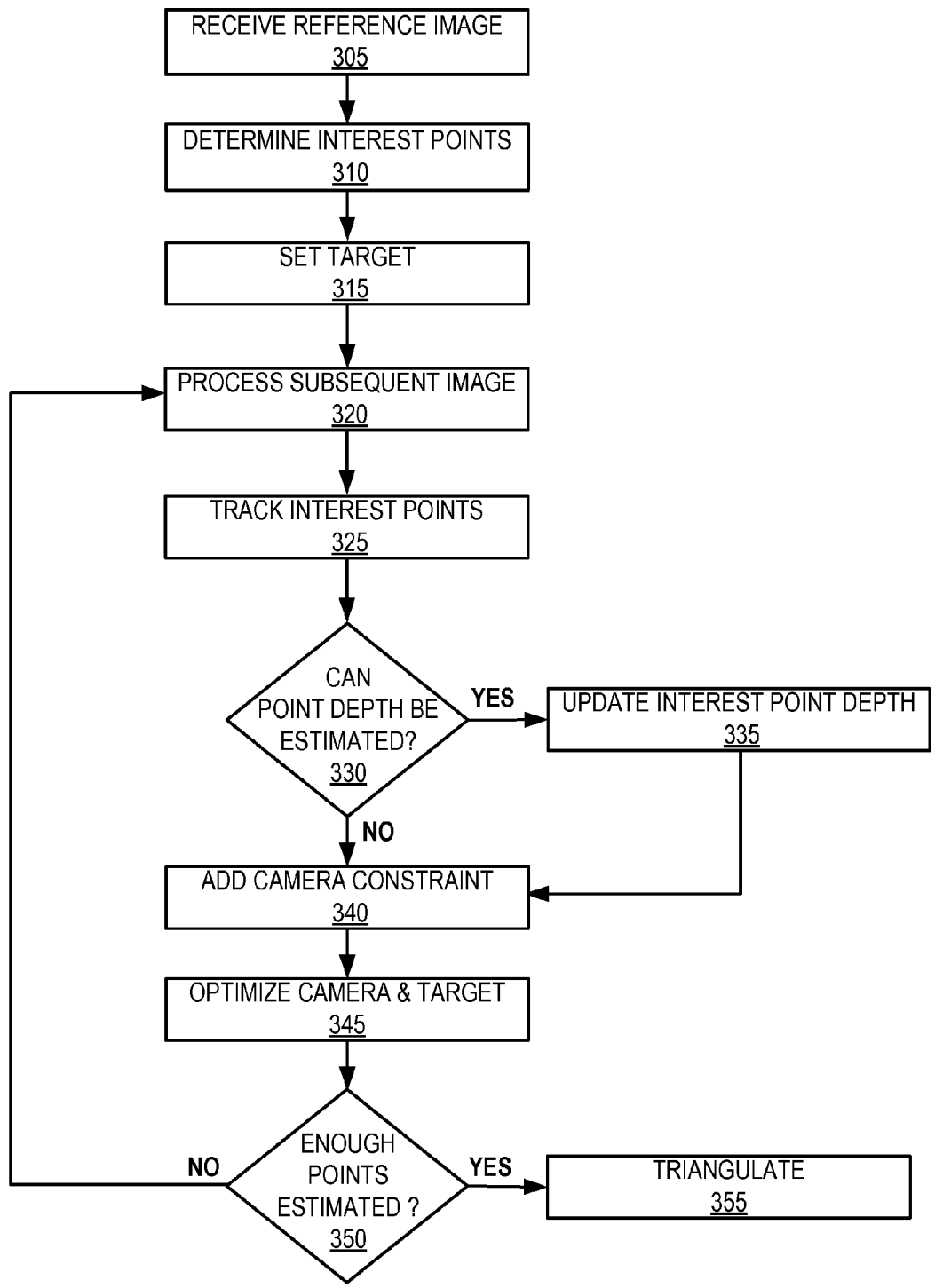
FIG. 3 illustrates a flow diagram of another embodiment of Fast VSLAM Initialization.

FIG. 3 illustrates a flow diagram of one embodiment of Fast VSLAM Initialization.

At block 305, the FVI may read or receive an image to use as a reference image. The reference image may be an initial captured image from a camera sensor/image feed, or may be selected by a user. In one embodiment, the FVI can initialize a 3D target without any user input for selecting an initial image. In one embodiment, building the 3D target is initiated when the camera 114 moves in any direction. The reference image can be a starting point for continuously estimating a target's true/refined shape as the camera 114 moves in 6 DoF and captures subsequent images. In one embodiment, a user can move the camera 114 in any direction and tracking and initialization of the 3D target may be performed when the original scene stays at least partially visible. In one embodiment, by assigning points an assumed depth value camera tracking may be performed instantly, in real-time, near real-time, or within a short time window from the first image (reference image) onwards.

At block 310, the FVI may determine a set of 3D interest points from the reference image using one of the methods described above.

At block 315, the FVI may set the target to a geometric shape. In one embodiment, the geometric shape may take the form of a plane, however, other shapes may be used to set the target. In one embodiment, the FVI may assign each of the 3D interest points to a same/equal fixed depth value. The interest points may initially lie along a 2D plane parallel to the image plane. In one embodiment, the assumption that all 3D interest points are on a plane parallel to the image plane (e.g., the sensor or camera plane) facilitates real-time, near real-time, or fast tracking of the target with incremental refinement as the 3D point depths are updated.

Figure 4:
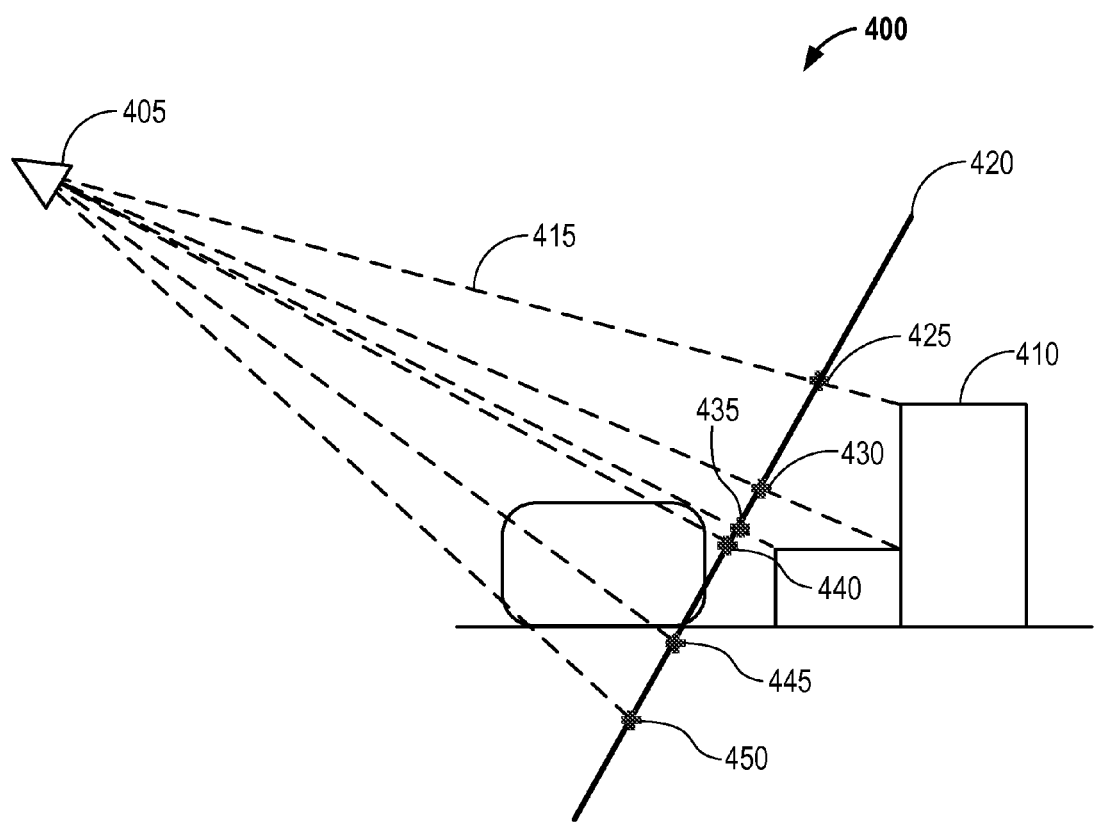
FIG. 4 illustrates an exemplary side schematic view of a camera capturing an image of target initialized with a plane.

FIG. 4 illustrates one embodiment of a side schematic view of a camera capturing an image of target initialized with a plane. FIG. 4 also interest points of a target (e.g., interest points 425, 430, 435, 440, 445, and 450) set to plane 420 at a predefined initial distance, as viewed from camera 114 at position 405. Interest points may be extracted using one of the well-known techniques for extraction as disclosed above. For example, as disclosed above, 2D interest points $p_i=(u_i,v_i)$ can be extracted from an image. Each interest point can be associated with an initial depth (e.g., as disclosed above, $z_i=1$ or another predetermined initialization value), such that all interest points are initially along the same plane (e.g., points 425, 430, 435, 440, 445, and 450 along the single plane 420).

In other embodiments, the interest points may be initialized with any other geometric shape, or any arrangement of initialized depth values. For example, the FVI may determine that another geometric shape should be the baseline starting point for the target, and refine as more target information is discovered. Furthermore, instead of every interest point having the same depth value, the initialized depth values may be individually estimated or determined by other techniques as known in the art. For example, the initial depth values may be a range of values such that the average interest point depth falls within a predetermined threshold average depth.

FIG. 4 also illustrates objects (e.g., object 410) representing the 3D scene observed by camera 114. Line 415 illustrates the ray under which an interest point 425 associated with object 410 is seen (e.g., the interest point 425 associated with the edge of object 410 has an initial equal depth as other interest points detected along the plane 420). The distance from camera 114 at position 405 to interest point 425 along line 415 is the assumed depth of interest point 425.

Referring to FIG. 3, at block 320, the FVI can begin processing a subsequent image. In one embodiment, as device 100 moves with respect to the objects within the reference image (e.g., object 410), camera 114 can continue to capture and process one or more subsequent images of the target from different viewpoints. In some instances, the subsequent image(s) may immediately follow the reference image. Alternatively, the subsequent image(s) may be captured from a stream of images and captured at any later time after the reference image (e.g., other images may be captured immediately between the reference image and a subsequent image). Processing a subsequent image can include extracting or determining a set of 3D interest points within the subsequent image. The set of 3D interest points in the subsequent image(s) may be the same or equivalent to 3D interest points determined from the reference image, except the 3D interest points in the subsequent image(s) may be at a different depth or location compared to the reference image.

The FVI may start processing subsequent images immediately after determination of the reference image, or alternatively, may delay processing until two or more images have been detected (e.g., within a camera feed). For example, the camera 114 may capture images at 30 frames per second, however the FVI may determine that the 5 immediately subsequent frames (e.g., or frames captured within a period of time immediately following the capture of the initial reference image) are unlikely to result in measurable camera translation. Therefore, in some embodiments, the FVI may bypass a one or more subsequent frames or a period of time subsequent to the initial reference frames may be bypassed. Similarly, the FVI may not always process every image in an image feed in order to reduce overall processing time. For example, the FVI may use a sample of the feed of images (e.g., every other recorded image, or one in every five recorded images) to process for interest points.

At block 325, the FVI can track the interest points of the subsequent image. In some embodiments, tracking the target includes comparing locations of each 3D interest point from the reference image with a corresponding 3D interest point from the subsequent image and determining a change in location of one or more of the same 3D interest points found in both images. For each subsequent image (e.g., an image captured and processed after the initial reference image) the FVI may determine whether the subsequent image is a candidate for assignment as a second reference image as disclosed in greater detail below. For some motion, the plane approximation reduces or eliminates tracking errors such that any remaining errors are largely unnoticed by a user. For example, for small movements, the first plane approximation of the scene can be accurate enough that tracking errors are not noticeable. Images resulting from these small movements would not be used as the subsequent reference image, however, this promotes further scene exploration by the user until a second reference image is obtained to further reduce any errors.

Figure 5:
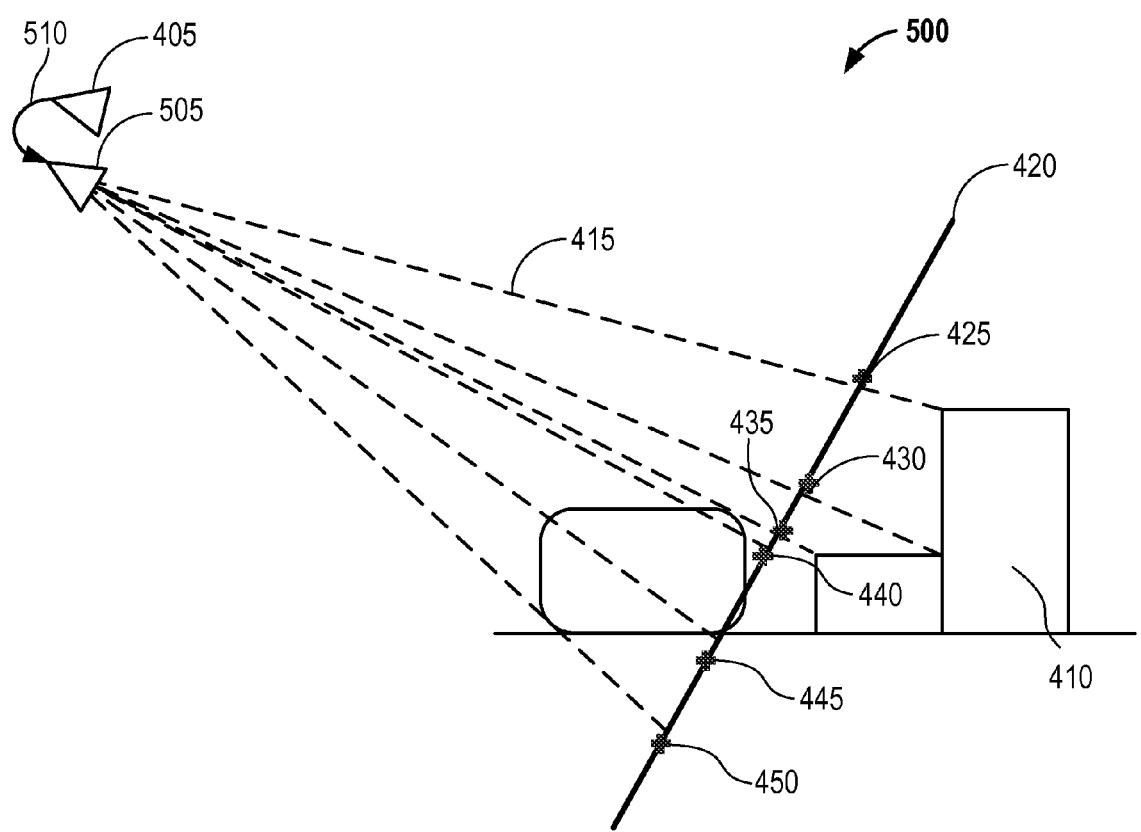
FIG. 5 illustrates an exemplary side schematic view of a camera capturing an image of a scene and a small motion by the camera.

One embodiment of small movement tracking with a plane is illustrated in FIG. 5 as side schematic view of small movement 510 from camera position 405 to camera position 505. As illustrated in FIG. 5, the ray lines and interest points may initially diverge with small movement 510 from camera position 405.

Figure 6:
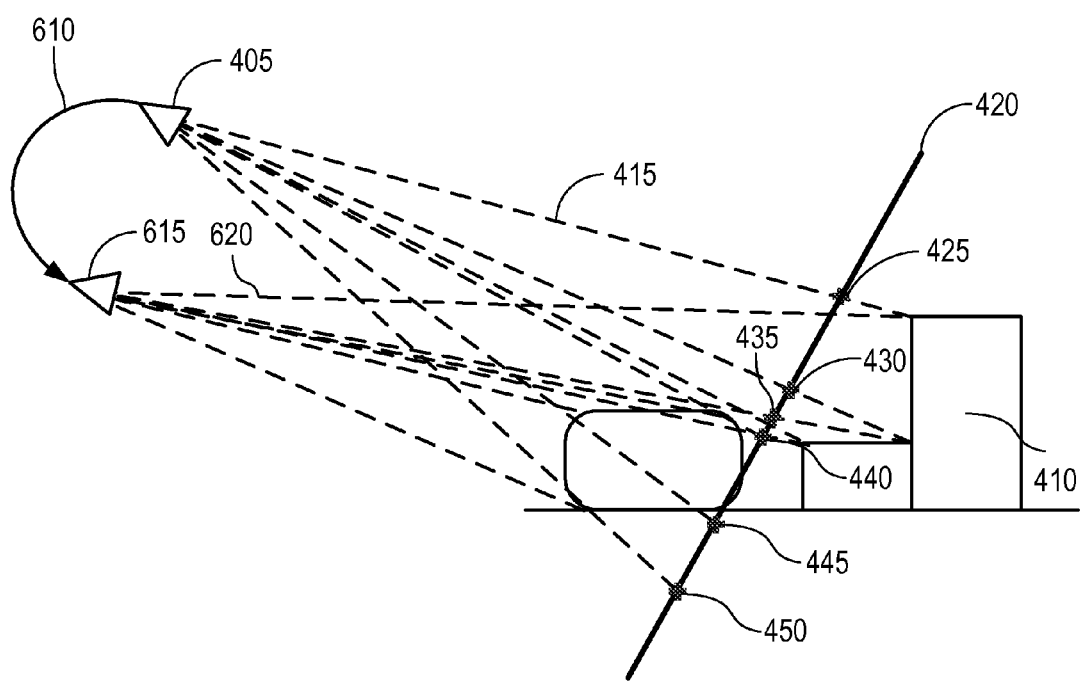
FIG. 6 illustrates an exemplary side schematic view of a camera capturing an image of a scene and a large motion by the camera.

FIG. 6 illustrates one embodiment of a side schematic view of a camera capturing an image of a scene and a large motion 610 by the camera from position 405 to new camera position 615. FIG. 6 illustrates the ray 415 previously associated with interest point 425, becomes ray 620, and no longer accurately tracks the interest point 425.

Referring to FIG. 3, at block 330, the FVI can determine whether each interest point depth, i.e. a 3D point location, can be estimated. 3D point estimation respects the epipolar constraint because it jointly estimates camera motion and all possible 3D points. As discussed above, for each interest point the information matrix $J_w^T J_w$ of the inverse depth parameter is tested to determine if the depth of an interest point can be estimated. If an interest point depth cannot be estimated, the FVI may proceed to block 340 and add a camera constraint. Otherwise, if an interest point can be estimated, the estimated interest point is added to a list of updated points at block 335. Alternatively the estimated interest point may update a main storage location (e.g., database, flat file, or other storage type) for the interest points instead of maintaining a separate list or location for updated points. After either updating the interest points or determining no update is possible, the FVI may proceed to block 340 to add a camera constraint for the interest point.

At block 340, camera constraint is added to the interest points. Constraints as used herein are the linear constraints given by the Jacobians and the observed 2D measurement. See above for the detailed discussion of the projection function and Jacobians with respect to R, T, and w.

At block 345, the FVI can optimize camera and target. In one embodiment, the FVI optimizes the camera 114 and target based on movements of the camera 114. As a user moves camera 114, the display can provide updates to the user in real time. Receiving real time feedback can encourage a user to continue moving the camera 114. Additional camera movement can provide further refinement of the target and greater accuracy in tracking. For example, in an AR context, device 100 may display an integrated graphic or object with the target and the graphic or object can be positioned in the scene such that when the camera is moved (e.g., in one of 6 DoF) the graphic or object maintains its relative position to other objects or the environment (relative to their positions and orientations as determined from the first reference image).

At block 350, the FVI can determine whether enough points have been estimated. A threshold for the number of points is set through testing the method in different scenes, for example the threshold may be set based on design and system parameters. In one embodiment, the threshold may be set at 100 points, or alternatively 150 points, or some other number. If there have been enough points, the FVI may proceed to block 355. In one embodiment, when the threshold number of points is met, the FVI can assign the image associated with the points as the second reference image and proceed to block 355. Otherwise, the FVI continues to process a subsequent image at block 320. In one embodiment, the FVI can iterate through multiple subsequent images (e.g., from a series of image frames captured from camera 114) processing each image while determining if enough interest points have been estimated.

Figure 7:
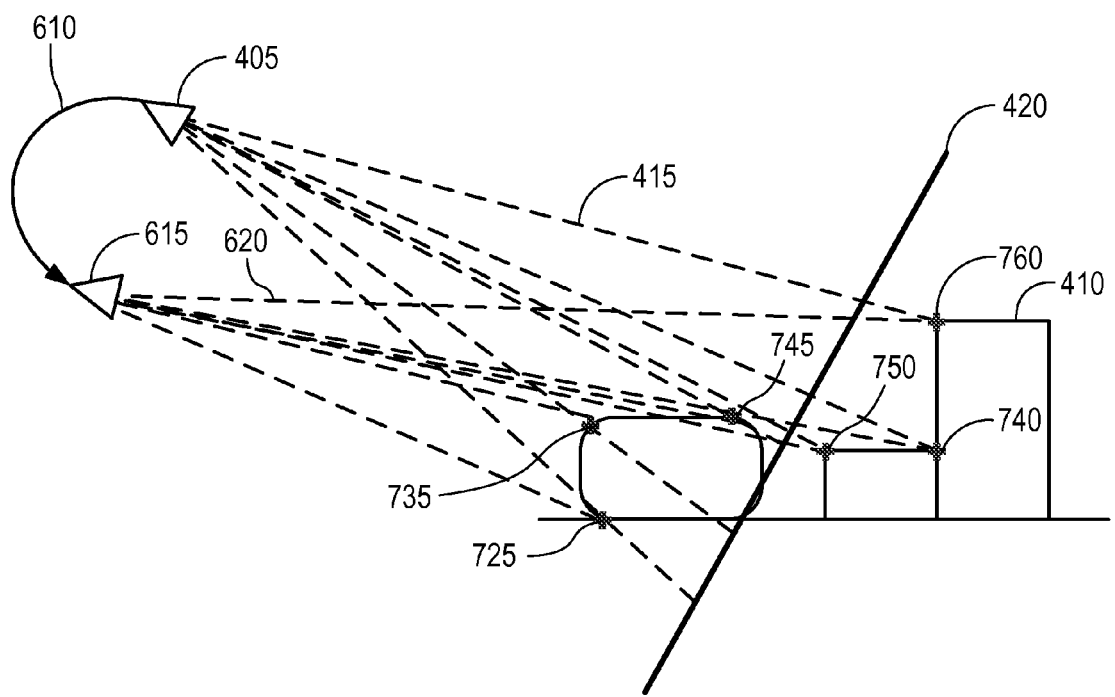
FIG. 7 illustrates an exemplary side schematic view of an updated set of interest points in a representation of a scene after a large motion by the camera.

At block 355, the FVI can be determined as complete and increased accuracy tracking is provided for subsequent images. For example, as illustrated in FIG. 7, the FVI can triangulate interest point locations from the first and second reference image. The two reference images may depict the same target (e.g., a section of an object or scene) from different viewing directions. The FVI may find correspondences (i.e., interest point locations in both the first and second images) and calculate the 3D structure of these corresponding interest points along with the motion that moved the camera from the first reference image to the second reference image. The triangulation of the interest points may be considered a second level of refinement after the initial small motion refinements described above. The triangulation can occur after two reference images are determined.

FIG. 7 illustrates as side schematic view of a camera 405 after large camera movement and after a second reference image allows for more accurate (i.e. updated) interest point depths for each of a set of points 725, 735, 745, 750, 740, and 760 observed by the camera 114 (615). Line 620 illustrates the ray under which an updated interest point 760 is seen.

The teachings herein may be incorporated into (e.g., implemented within or performed by) a variety of apparatuses (e.g., devices). For example, one or more aspects taught herein may be incorporated into a phone (e.g., a cellular phone), a personal data assistant ("PDA"), a tablet, a mobile computer, a laptop computer, a tablet, an entertainment device (e.g., a music or video device), a headset (e.g., headphones, an earpiece, etc.), a medical device (e.g., a biometric sensor, a heart rate monitor, a pedometer, an EKG device, etc.), a user I/O device, a computer, a server, a point-of-sale device, an entertainment device, a set-top box, or any other suitable device. These devices may have different power and data requirements and may result in different power profiles generated for each interest point or set of interest points.

In some aspects a wireless device may comprise an access device (e.g., a Wi-Fi access point) for a communication system. Such an access device may provide, for example, connectivity to another network through transceiver 140 (e.g., a wide area network such as the Internet or a cellular network) via a wired or wireless communication link. Accordingly, the access device may enable another device (e.g., a Wi-Fi station) to access the other network or some other functionality. In addition, it should be appreciated that one or both of the devices may be portable or, in some cases, relatively non-portable.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, engines, circuits, and algorithm steps described in connection with the embodiments disclosed herein may be implemented as electronic hardware, computer software, or combinations of both. To clearly illustrate this interchangeability of hardware and software, various illustrative components, blocks, modules, engines, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in software executed by a processor, or in a combination of the two. Software may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary embodiments, the functions or modules described may be implemented in hardware (e.g., hardware 162), software (e.g., software 165), firmware (e.g., firmware 163), or any combination thereof. If implemented in software as a computer program product, the functions or modules may be stored on or transmitted over as one or more instructions or code on a non-transitory computer-readable medium. Computer-readable media can include both computer storage media and communication media including any medium that facilitates transfer of a computer program from one place to another. A storage media may be any available media that can be accessed by a computer. By way of example, and not limitation, such non-transitory computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a web site, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of non-transitory computer-readable media.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A processor-implemented method for visual simultaneous localization and mapping, the method comprising:
    initializing a three-dimensional (3D) target based on a first set of target 3D points obtained from a first reference image, wherein the target 3D points in the first set are initialized along a plane at a predetermined initial depth value prior to processing a subsequent image;
    processing one or more subsequent images;
    tracking the 3D target in six degrees of freedom; and
    refining the 3D target based on subsequent sets of target 3D points obtained from the processing of the one or more subsequent images, each subsequent set of target 3D points corresponding to one of the one or more subsequent images.

2. The processor-implemented method of claim 1, further comprising:
    displaying a correctly aligned, positioned, and distanced augmented reality representation of the 3D target upon initializing the 3D target and prior to the processing of the one or more subsequent images.

3. The processor-implemented method of claim 2, further comprising:
    updating the augmented reality representation of the 3D target while tracking the 3D target in six degrees of freedom.

4. The processor-implemented method of claim 1, wherein the processing one or more subsequent images further comprises:
    extracting 2D interest points from the one or more subsequent images.

5. The processor-implemented method of claim 1, wherein initializing the 3D target further comprises:
    extracting a reference set of 2D interest points from the first reference image;
    determining the first set of target 3D points for the first reference image, each target 3D point in the first set corresponding to a 2D interest point in the reference set of 2D interest points; and
    assigning the predetermined initial depth value, as a corresponding initial depth value, to each target 3D point.

6. The processor-implemented method of claim 5, wherein the tracking the 3D target further comprises comparing a reference location corresponding to at least one of the target 3D points in the reference set to a corresponding updated 2D location of the at least one target 3D points extracted from the one or more subsequent images.

7. The processor-implemented method of claim 5, wherein refining the 3D target further comprises:
    determining an updated depth value for one or more of the target 3D points in the first set based on corresponding target 3D points in a subsequent set; and
    replacing the assigned corresponding initial depth value for each of the one or more target 3D points in the first set with the corresponding updated depth value.

8. The processor-implemented method of claim 7, further comprising:
    determining when a threshold number of the target 3D points having updated depth values is met, wherein the threshold number of target 3D points is obtained from a corresponding subsequent image of the one or more subsequent images; and
    assigning the respective subsequent image as a second reference image.

9. The processor-implemented method of claim 8, wherein the refining of the 3D target further comprises performing a further refinement of the 3D target by triangulating the target 3D points with a plurality of 2D interest points extracted from the second reference image.

10. A computer readable non-transitory storage medium containing executable program instructions which cause a data processing device to perform a method for visual simultaneous localization and mapping, the method comprising:

initializing a three-dimensional (3D) target based on a first set of target 3D points obtained from a first reference image, wherein the target 3D points in the first set are initialized along a plane at a predetermined initial depth value prior to processing a subsequent image;

processing one or more subsequent images;

tracking the 3D target in six degrees of freedom; and refining the 3D target based on the processing of subsequent sets of target 3D points obtained from the one or more subsequent images, each subsequent set of target 3D points corresponding to one of the one or more subsequent images.

11. The medium of claim 10, further comprising:
displaying a correctly aligned, positioned, and distanced augmented reality representation of the 3D target upon initializing the 3D target and prior to the processing of the one or more subsequent images.

12. The medium of claim 11, further comprising:
updating the augmented reality representation of the 3D target while tracking the 3D target in six degrees of freedom.

13. The medium of claim 10, wherein the processing one or more subsequent images further comprises:
extracting 2D interest points from the one or more subsequent images.

14. The medium of claim 10, wherein initializing the 3D target further comprises:
extracting a reference set of 2D interest points from the first reference image;
determining the first set of target 3D points, each target 3D point in the first set corresponding to a 2D interest point in the reference set of 2D interest points; and
assigning the predetermined initial depth value, as a corresponding initial depth value, to each target 3D point.

15. The medium of claim 14, wherein the tracking the 3D target further comprises comparing a reference location corresponding to at least one of the target 3D points in the reference set to a corresponding updated 2D location of the at least one target 3D points extracted from the one or more subsequent images.

16. The medium of claim 14, wherein refining the 3D target further comprises:
determining an updated depth value for one or more of the target 3D points in the first set based on corresponding target 3D points in a subsequent set; and
replacing the assigned corresponding initial depth value for each of the one or more target 3D points in the first set with the corresponding updated depth value.

17. The medium of claim 16, further comprising:
determining when a threshold number of the target 3D points having updated depth values is met, wherein the threshold number of target 3D points is obtained from a corresponding subsequent image of the one or more subsequent images; and
assigning the respective subsequent image as a second reference image.

18. The medium of claim 17, wherein the refining of the 3D target further comprises performing a further refinement of the 3D target by triangulating the target 3D points with a plurality of 2D interest points extracted from the second reference image.

19. A data processing device for visual simultaneous localization and mapping comprising:

a processor; and a storage device coupled to the processor and configurable for storing instructions, which, when executed by the processor cause the processor to:

initialize a three-dimensional (3D) target based on a first set of target 3D points obtained from a first reference image, wherein the target 3D points in the first set are initialized along a plane at a predetermined initial depth value prior to processing a subsequent image;

process one or more subsequent images;

track the 3D target in six degrees of freedom; and refine the 3D target based on the processing of subsequent sets of target 3D points obtained from the one or more subsequent images, each subsequent set of target 3D points corresponding to one of the one or more subsequent images.

20. The data processing device of claim 19, further comprising instructions to:
display a correctly aligned, positioned, and distanced augmented reality representation of the 3D target upon initializing the 3D target and prior to the processing of the one or more subsequent images.

21. The data processing device of claim 20, further comprising instructions to:
update the augmented reality representation of the 3D target while tracking the 3D target in six degrees of freedom.

22. The data processing device of claim 19, wherein the processing one or more subsequent images further comprises instructions to:
extract 2D interest points from the one or more subsequent images.

23. The data processing device of claim 19, wherein initializing the 3D target further comprises instructions to:
extract a reference set of 2D interest points from the first reference image;
determine the first set of target 3D points, each target 3D point in the first set corresponding to a 2D interest point in the reference set of 2D interest points; and
assign the predetermined initial depth value, as a corresponding initial depth value, to each target 3D point.

24. The data processing device of claim 23, wherein tracking the 3D target further comprises comparing a reference location corresponding to at least one of the target 3D points in the reference set to a corresponding updated 2D location extracted from the one or more subsequent images.

25. The data processing device of claim 23, wherein refining the 3D target further comprises instructions to:
determine an updated depth value for one or more of the target 3D points in the first set based on corresponding target 3D points in a subsequent set; and
replace the assigned corresponding initial depth value for each of the one or more target 3D points in the first set with the corresponding updated depth value.

26. The data processing device of claim 25, further comprising instructions to:
determine when a threshold number of the target 3D points having updated depth values is met, wherein the threshold number of target 3D points is obtained from a corresponding subsequent image of the one or more subsequent images; and
assign the respective subsequent image as a second reference image.

27. The data processing device of claim 26, wherein the refining of the 3D target further comprises instructions to perform a further refinement of the 3D target by triangulating the target 3D points with a plurality of 2D interest points extracted from the second reference image.

28. An apparatus for visual simultaneous localization and mapping comprising:
   means for initializing a three-dimensional (3D) target based on a first set of target 3D points obtained from a first reference image, wherein the target 3D points in the first set are initialized along a plane at a predetermined initial depth value prior to processing a subsequent image;
   means for processing one or more subsequent images;
   means for tracking the 3D target in six degrees of freedom; and
   means for refining the 3D target based on the processing of subsequent sets of target 3D points obtained from the one or more subsequent images.

29. The apparatus of claim 28, further comprising:
   means for displaying a correctly aligned, positioned, and distanced augmented reality representation of the 3D target upon initializing the 3D target and prior to the processing of the one or more subsequent images.

30. The apparatus of claim 29, further comprising:
   means for updating the augmented reality representation of the target while tracking the 3D target in six degrees of freedom.

31. The apparatus of claim 28, wherein the processing one or more subsequent images further comprises:
   means for extracting 2D interest points from the one or more subsequent images.

32. The apparatus of claim 28, wherein initializing the 3D target further comprises:
   means for extracting a reference set of 2D interest points from the first reference image;
   means for determining the first set of target 3D points, each target 3D point corresponding to a 2D interest point in the reference set of 2D interest points; and
   means for assigning the predetermined initial depth value, as a corresponding initial depth value, to each target 3D point.

33. The apparatus of claim 32, wherein the tracking the 3D target further comprises means for comparing a reference location corresponding to at least one of the target 3D points in the reference set to a corresponding updated 2D location of the at least one target 3D points extracted from the one or more subsequent images.

34. The apparatus of claim 32, wherein refining the 3D target further comprises:
   means for determining an updated depth value for one or more of the target 3D points in the first set based on corresponding target 3D points in a subsequent set; and
   means for replacing the assigned corresponding initial depth value for each of the one or more target 3D points in the first set with the corresponding updated depth value.

35. The apparatus of claim 34, further comprising:
   means for determining when a threshold number of the target 3D points having updated depth values is met, wherein the threshold number of target 3D points is obtained from a corresponding subsequent image of the one or more subsequent images; and
   means for assigning the respective subsequent image as a second reference image.

36. The apparatus of claim 35, wherein the refining of the 3D target further comprises means for performing a further refinement of the 3D target by triangulating the target 3D points with a plurality of 2D interest points extracted from the second reference image.

* * * * *